United States Patent
Baehrle-Miller

(10) Patent No.: US 10,279,787 B2
(45) Date of Patent: May 7, 2019

(54) METHOD AND DEVICE FOR CARRYING OUT A DRIVER-INDEPENDENT BRAKE FORCE HOLDING FUNCTION IN A MOTOR VEHICLE WHEN THE MOTOR VEHICLE IS AT A STANDSTILL ON A ROADWAY THAT IS INCLINED IN THE VEHICLE LONGITUDINAL DIRECTION

(71) Applicant: Robert Bosch GmbH, Stuttgart (DE)

(72) Inventor: Frank Baehrle-Miller, Schoenaich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/765,649

(22) PCT Filed: Sep. 16, 2016

(86) PCT No.: PCT/EP2016/072084
§ 371 (c)(1),
(2) Date: Apr. 3, 2018

(87) PCT Pub. No.: WO2017/067725
PCT Pub. Date: Apr. 27, 2017

(65) Prior Publication Data
US 2018/0281758 A1   Oct. 4, 2018

(30) Foreign Application Priority Data

Oct. 19, 2015   (DE) .................. 10 2015 220 283

(51) Int. Cl.
*B60T 8/17*   (2006.01)
*B60T 7/12*   (2006.01)

(52) U.S. Cl.
CPC ................ *B60T 8/17* (2013.01); *B60T 7/122* (2013.01); *B60T 2201/06* (2013.01)

(58) Field of Classification Search
CPC ......... B60T 8/17; B60T 7/122; B60T 2201/06
See application file for complete search history.

(56) References Cited

U.S. PATENT DOCUMENTS

2012/0161508 A1* 6/2012 Beever ..................... B60T 7/12
   303/191
2016/0121861 A1* 5/2016 Korte ....................... B60T 7/12
   701/70
2017/0088112 A1* 3/2017 Futagami .............. B60T 13/662

FOREIGN PATENT DOCUMENTS

DE   102004062811 A1   6/2006
DE   102007027357 A1   12/2007
FR       3014806 A1   6/2015

OTHER PUBLICATIONS

Norie et al., FR3014806, Jun. 19, 2015 (machine translation).*
(Continued)

*Primary Examiner* — Courtney D Heinle
(74) *Attorney, Agent, or Firm* — Norton Rose Fulbright US LLP; Gerard Messina

(57) ABSTRACT

A method for carrying out a driver-independent brake force holding function in a motor vehicle when the motor vehicle is at a standstill on a roadway that is inclined in the vehicle longitudinal direction. The brake force, maintained independently of the driver, is reduced when a release condition is met. In the method, the uphill distance, which corresponds to the spacing or the distance from the neighboring vehicle in the uphill direction, is ascertained with the aid of a first distance sensor system. If the uphill distance falls below a predetermined limiting value, the brake force is reduced before the release condition is met, so that the motor vehicle moves.

8 Claims, 2 Drawing Sheets

(56) References Cited

OTHER PUBLICATIONS

Ihlein et al., DE102004062811, Jun. 8, 2006 (machine translation).*
International Search Report dated Nov. 18, 2016, of the corresponding International Application PCT/EP2016/072084 filed Sep. 16, 2016.

* cited by examiner

METHOD AND DEVICE FOR CARRYING OUT A DRIVER-INDEPENDENT BRAKE FORCE HOLDING FUNCTION IN A MOTOR VEHICLE WHEN THE MOTOR VEHICLE IS AT A STANDSTILL ON A ROADWAY THAT IS INCLINED IN THE VEHICLE LONGITUDINAL DIRECTION

BACKGROUND INFORMATION

There are functions available for motor vehicles that brake the vehicle to a stop for a defined period.

Within the scope of a conventional automated vehicle hold (AVH) function, when a standstill is recognized on an uphill grade or a downhill grade, the vehicle is held at a standstill by braking interventions until an appropriate driver intent is detected. When this driver intent is present, the braking system reduces the brake pressure and releases the vehicle for further travel. If an unintentional vehicle movement is recognized during the standstill even though no driver intent is present, the vehicle is once again brought to a standstill by a driver-independent increase in the brake pressure.

A conventional hill hold control (HHC) function blocks the brake pressure in the braking system that is present at the time of the standstill. After a time interval of approximately 2 seconds elapses without actuation of the brake pedal, the pressure is automatically reduced. This function is used as starting assistance on uphill grades and downhill grades to allow starting without interaction with the parking brake.

SUMMARY

The present invention relates to a method for carrying out a driver-independent brake force holding function in a motor vehicle when the motor vehicle is at a standstill on a roadway that is inclined in the vehicle longitudinal direction, the brake force, maintained independently of the driver, being reduced when a predefined release condition is met. In accordance with an example method, the uphill distance, which corresponds to the spacing or the distance from the neighboring vehicle in the uphill direction, is ascertained with the aid of a first distance sensor system, and if the uphill distance falls below a predetermined limiting value, the brake force is reduced before the release condition is met, so that the motor vehicle moves.

Collisions due to a sudden, unintentional rolling movement of the vehicle in front of or behind the host vehicle may be avoided in this way.

One advantageous embodiment of the present invention includes that in addition, the downhill distance, which corresponds to the distance from the neighboring vehicle in the downhill direction, is ascertained with the aid of a second distance sensor system, and if the downhill distance falls below a predetermined limiting value, the reduced brake force is once again increased and the motor vehicle is brought to a standstill.

Due to the driver-independent reduction of the brake force of the host vehicle, the host vehicle is set in motion in order to avoid a collision caused by an outside party. As a result of the renewed increase in the brake force if necessary, a collision of the host vehicle caused by the host vehicle driver due to its deliberately initiated rolling movement is avoided.

Thus, in accordance with the present invention, the front distance from the preceding vehicle and the rear distance from the following vehicle are ascertained with the aid of a distance sensor system, and when the front distance falls below a predefined limiting value in the case of an inclined uphill roadway and/or when the rear distance falls below a predefined limiting value in the case of an inclined downhill roadway, the brake force is reduced before the release condition is met, so that the motor vehicle moves.

In one embodiment of the present invention, when the rear distance falls below a predefined limiting value in the case of an inclined uphill roadway and/or when the front distance falls below a predefined limiting value in the case of an inclined downhill roadway, the brake force is once again increased and the motor vehicle is brought to a standstill.

One advantageous embodiment of the present invention is characterized in that the first and second distance sensor systems are ultrasonic sensor systems, video sensor systems, or radar sensor systems.

In particular, the embodiment is characterized in that the first and second distance sensor systems are distance sensor systems used within the scope of a parking assistance system or a parking system. A double use of the distance sensor system may thus be achieved.

One advantageous embodiment of the present invention is characterized in that the brake force holding function maintains, independently of the driver, a brake force that holds the motor vehicle at a standstill when a roadway inclination in the longitudinal direction and a vehicle standstill are present, and the predefined release condition is a start-up intent of the driver, in particular an accelerator pedal actuation by the driver. This involves in particular an automated vehicle hold (AVH) function.

One advantageous embodiment of the present invention includes that in addition, the roadway longitudinal inclination is ascertained when the motor vehicle is at a standstill, and the brake force maintained independently of the driver is a function of the ascertained roadway longitudinal inclination. The ascertainment of the roadway longitudinal inclination may also be used to determine whether an inclined uphill or downhill roadway is present, or which of the neighboring vehicles is situated in the uphill direction from the host vehicle and which is situated in the downhill direction from the host vehicle.

In particular, the roadway longitudinal inclination may be ascertained with the aid of a longitudinal acceleration sensor.

One advantageous embodiment of the present invention is characterized in that the brake force holding function maintains the brake pressure prevailing at the time of the vehicle standstill, and the predefined release condition is the elapse of a time interval having a predefined length after the brake pedal actuation by the driver is concluded. This involves in particular a hill hold control (HHC) function.

Moreover, the present invention includes a device that contains means designed for carrying out the method according to the present invention. This involves in particular a control unit in which the program code for carrying out the method according to the present invention is stored.

DETAILED DESCRIPTION OF EXAMPLE EMBODIMENTS

The AVH and HHC functions considered in the related art regard only the host vehicle. The surroundings are not observed within the scope of these functions, and therefore these functions also cannot respond to changes in the vehicle surroundings.

With the method according to the present invention, brake force holding systems may be fully utilized, and in addition, potential rear-end collisions may be responded to with minimal complexity, so that damage to the host vehicle and to the other vehicle is avoided or reduced.

Embodiments of the present invention include the use of a surroundings sensor system or distance sensor system that detects the surroundings, i.e., the distance from the neighboring vehicle at the front and rear sides. In many cases, distance sensors, which usually operate based on ultrasound, are already presently installed in the vehicle bumpers. The distance from obstacles in front of or behind the vehicle may thus be estimated. This information is, for example, visually or acoustically displayed to the driver. Of course, this distance may also be ascertained with optical or radar-based methods. A wheel speed measurement or vehicle speed measurement may take place with the aid of wheel speed sensors, for example. The presence of an unintentional vehicle movement may thus be detected, and a driver-independent brake pressure build-up may then take place.

In addition, with the aid of longitudinal acceleration sensors it is possible to ascertain the instantaneous roadway longitudinal inclination at a standstill. This variable allows ascertainment of the brake pressure, which is necessary to safely hold the vehicle. Furthermore, the starting torque that is necessary for smoothly starting the vehicle without rolling back may thus also be ascertained.

Figure 1:
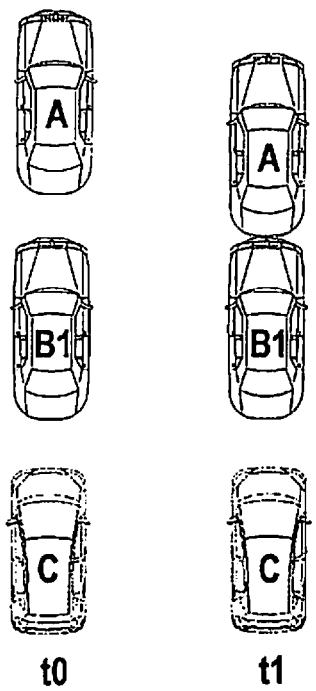
FIG. 1 shows one possible collision scenario that is to be avoided with the present invention.

FIG. 1 shows a scenario that is to be avoided with the present invention. Three vehicles A, B1, and C are considered which at point in time t0 are stopped one behind the other on an uphill grade. This is illustrated in the left column of FIG. 1. Vehicle B1 is equipped with an AVH function which is also active at point in time t0 and holds the vehicle. Vehicle A stopped in front of B1 has no AVH function, or its AVH function is deactivated. During the starting operation of A at point in time t1, vehicle A may unintentionally move backward. If the distance between vehicles A and B1 is too small, vehicle A may collide with vehicle B1 as it unintentionally rolls backward. To avoid this rear-end collision, the driver of B1 would have to either deactivate the AVH function, using a button, or engage the reverse gear and travel backward. However, this is often not possible within the short time available.

Figure 2:
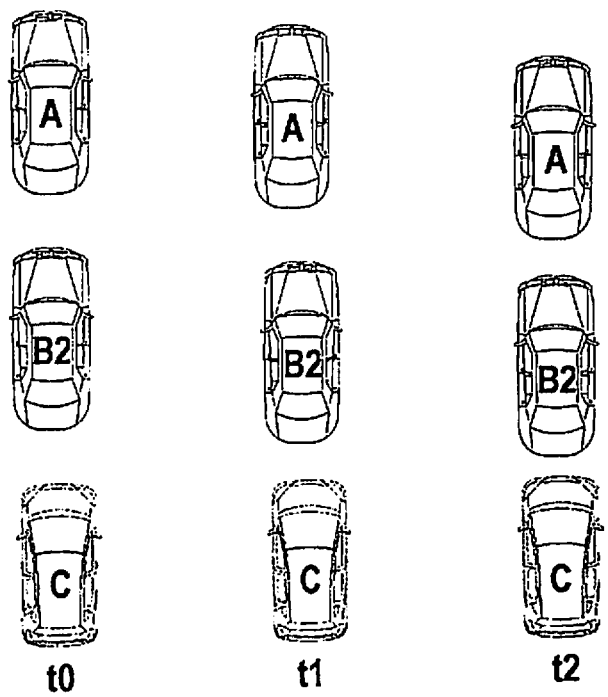
FIG. 2 shows the avoidance of the collision considered in FIG. 1 by use of the present invention.

The same scenario is considered in FIG. 2, except that vehicle B2 is equipped with an AVH function that is modified according to the present invention, which via distance sensors additionally detects and takes into account the distance from the preceding and following vehicles. This AVH function is active at point in time t0, at which vehicles A, B2, and C are stopped on an uphill roadway. Vehicle A once again either has no AVH function, or its AVH function is deactivated. During the starting operation of A, A may once again unintentionally roll backward in the opposite travel direction than intended. If the distance between A and B2 is small, A may even back into and collide with B2.

However, the distance from preceding vehicle A and following vehicle C is continuously detected in vehicle B2. If it is now recognized that the distance between A and B2 is too small, B2 rolls backward due to a driver-independent brake pressure reduction as long as no start-up intent of the driver is present and the distance from C allows this. This is illustrated in the middle column of FIG. 2 for point in time t1. However, in due time prior to contact with C, brake pressure is once again built up, independently of the driver, to avoid a collision of B2 with C. Due to this backward rolling movement which is controlled independently of the driver, and which is possible due to the coupling of the AVH function with the distance sensor system, the driver of A has more time to stop the backward rolling movement of his/her vehicle and to once again bring the vehicle to a standstill or move forward.

Figure 3:
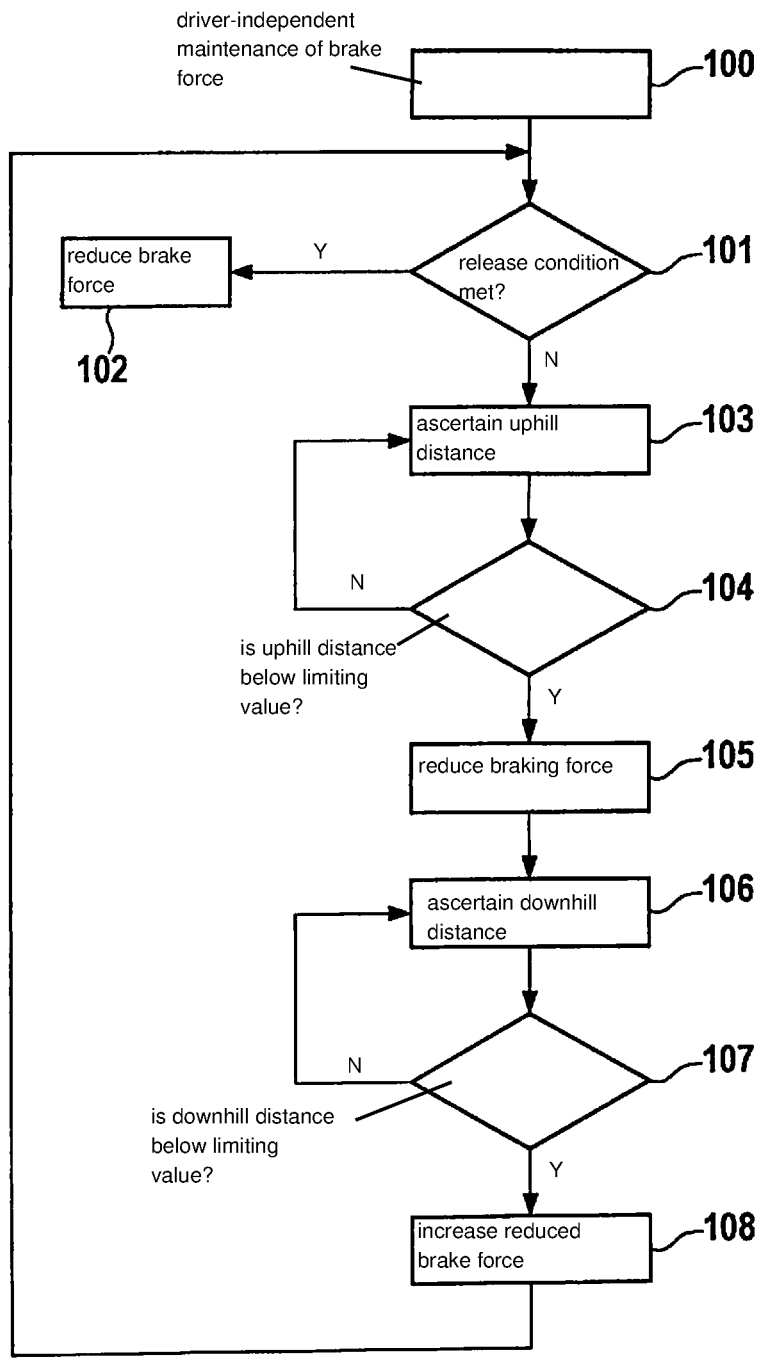
FIG. 3 shows the basic sequence of the method according to the present invention.

The sequence of one specific embodiment of the method according to the present invention is illustrated in FIG. 3. After the method starts in block 100 with the driver-independent maintenance of the brake force in a vehicle B2 that is equipped with a system according to the present invention, a query is made in block 101 as to whether a predefined release condition for reducing the brake force is met. This may be, for example, the elapse of a time interval having a predefined length, or also an accelerator pedal actuation by the driver. If this is the case, the brake force is reduced and the method is terminated in block 102. However, if this is not the case, the uphill distance, which corresponds to the distance from neighboring other vehicle A in the uphill direction, is ascertained in block 103 with the aid of a first distance sensor system. This is the spatial distance from neighboring other vehicle A in the longitudinal direction, which vehicle A would travel when rolling backward toward vehicle B2. It is subsequently ascertained in block 104 whether this distance falls below a limiting value. If this is not the case, the method returns to block 103. However, if the distance falls below the limiting value, i.e., other vehicle A has come sufficiently close to vehicle B2, the brake force holding vehicle B2 is reduced in block 105, so that vehicle B2 starts to move as well, and the distance from other vehicle A ideally either remains constant or even further increases once again. However, it must now be monitored whether the distance from likewise neighboring other vehicle C is decreased. Block 106 thus subsequently follows, in which the downhill distance, corresponding to the distance from neighboring vehicle C in the downhill direction, is ascertained with the aid of a second distance sensor system. This is the spatial distance from neighboring other vehicle C in the longitudinal direction, which vehicle B2 would travel when rolling backward toward vehicle C. It is therefore subsequently ascertained in block 107 whether the downhill distance falls below a predefined limiting value. If this is not the case, the method returns to block 106. However, if this is the case, the reduced brake force is once again increased and motor vehicle B2 is brought to a standstill in block 108 in order to avoid a collision with C. The method subsequently returns to block 101. This method is used to reduce the likelihood of a collision during the brake force holding phase of a brake force holding function.

What is claimed is:

1. A method for carrying out a driver-independent brake force holding function in a motor vehicle, the method comprising:

maintaining a brake force independent of the driver when the motor vehicle is at a standstill on a roadway that is inclined in the vehicle longitudinal direction;

reducing the brake force, maintained independently of the driver, when a release condition is met;

ascertaining, using a first distance sensor system, an uphill distance, which corresponds to a distance from a neighboring vehicle in an uphill direction;

reducing the brake force before the release condition is met when the uphill distance falls below a predetermined limiting value so that the motor vehicle moves;

ascertaining, using a second distance sensor system, a downhill distance which corresponds to the distance from a neighboring vehicle in a downhill direction; and after the step of reducing the brake force before the release condition is met is initiated, increasing the reduced brake force when the downhill distance falls below a predetermined limiting value as a consequence of the motor vehicle moving toward to the neighboring vehicle in the downhill direction, to bring the motor vehicle to a standstill.

2. The method as recited in claim 1, wherein the first distance sensor system and the second distance sensor system are one of ultrasonic sensor systems, video sensor systems, or radar sensor systems.

3. The method as recited in claim 1, wherein the first distance sensor system and the second distance sensor system are distance sensor systems used within the scope of one of a parking assistance system or a parking system.

4. The method as recited in claim 1, wherein the brake force holding function maintains, independently of the driver, a brake force that holds the motor vehicle at a standstill when a roadway inclination in the longitudinal direction and a vehicle standstill are present, and the predefined release condition is a start-up intent of the driver, the start-up intent of the driver being an accelerator pedal actuation by the driver.

5. The method as recited in claim 4, wherein the roadway longitudinal inclination is ascertained when the motor vehicle is at a standstill, and the brake force maintained independently of the driver is a function of the ascertained roadway longitudinal inclination.

6. The method as recited in claim 4, wherein the roadway longitudinal inclination is ascertained using a longitudinal acceleration sensor.

7. The method as recited in claim 1, wherein the brake force holding function maintains the brake pressure prevailing at the time of the vehicle standstill, and the release condition is an elapse of a time interval having a predefined length after a brake pedal actuation by the driver is concluded.

8. A device containing an arrangement for carrying out a driver-independent brake force holding function in a motor vehicle, the arrangement designed to:

maintain a brake force independent of the driver when the motor vehicle is at a standstill on a roadway that is inclined in the vehicle longitudinal direction;

reduce the brake force, maintained independently of the driver, when a release condition is met;

ascertain, using a first distance sensor system, an uphill distance, which corresponds to a distance from a neighboring vehicle in an uphill direction;

reduce the brake force before the release condition is met when the uphill distance falls below a predetermined limiting value so that the motor vehicle moves;

ascertain, using a second distance sensor system, a downhill distance which corresponds to the distance from a neighboring vehicle in a downhill direction; and after an initiation of the reduction of the brake force before the release condition is met, increase the reduced brake force when the downhill distance falls below a predetermined limiting value as a consequence of the motor vehicle moving toward to the neighboring vehicle in the downhill direction, to bring the motor vehicle to a standstill.

* * * * *